United States Patent
Zeng

(10) Patent No.: US 10,602,242 B2
(45) Date of Patent: Mar. 24, 2020

(54) APPARATUS, METHOD AND SYSTEM FOR MULTI-MODE FUSION PROCESSING OF DATA OF MULTIPLE DIFFERENT FORMATS SENSED FROM HETEROGENEOUS DEVICES

(71) Applicant: GM GLOBAL TECHNOLOGY OPERATIONS LLC, Detroit, MI (US)

(72) Inventor: Shuqing Zeng, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 402 days.

(21) Appl. No.: 15/622,628

(22) Filed: Jun. 14, 2017

(65) Prior Publication Data

US 2018/0367871 A1 Dec. 20, 2018

(51) Int. Cl.
| | |
|---|---|
| *G01S 13/86* | (2006.01) |
| *G01S 13/931* | (2020.01) |
| *G01S 17/89* | (2020.01) |
| *G01S 17/931* | (2020.01) |
| *G06K 9/62* | (2006.01) |
| *H04L 29/08* | (2006.01) |
| *H04N 7/18* | (2006.01) |
| *H04Q 9/00* | (2006.01) |
| *G01S 17/86* | (2020.01) |

(52) U.S. Cl.
CPC ............... *H04Q 9/00* (2013.01); *G01S 13/86* (2013.01); *G01S 13/867* (2013.01); *G01S 13/931* (2013.01); *G01S 17/86* (2020.01); *G01S 17/89* (2013.01); *G01S 17/931* (2020.01); *H04N 7/181* (2013.01); *G01S 2013/9323* (2020.01); *H04L 67/12* (2013.01); *H04Q 2209/30* (2013.01); *H04Q 2209/84* (2013.01)

(58) Field of Classification Search
CPC .. H04Q 9/00; H04Q 2209/30; H04Q 2209/84; G01S 13/86; G01S 13/867; G01S 13/931; G01S 17/023; G01S 17/89; G01S 17/936; G01S 2013/9367; G01S 17/86; G01S 17/931; G01S 2013/9323; G06K 9/6288; H04L 67/12; H04N 7/181
See application file for complete search history.

(56) References Cited

U.S. PATENT DOCUMENTS

| 9,128,185 B2 | 9/2015 | Zeng | |
| 2018/0089538 A1* | 3/2018 | Graham | ................. G05D 1/021 |

* cited by examiner

*Primary Examiner* — Tuan C To
*Assistant Examiner* — Kelly D Williams
(74) *Attorney, Agent, or Firm* — Lorenz & Kopf, LLP

(57) ABSTRACT

Apparatus, method and system for hybrid multi-mode data fusion to fuse data of multiple different formats by a centralized data fusion processing and send the fused data by a distributed data processing to a set of heterogeneous sensor devices. The hybrid multi-mode data fusion apparatus comprises a multi-mode fusion module configured to operate in a first mode to receive fused data of multiple different formats sensed from a set of heterogeneous devices and configured to operate in a second mode to send the fused data to each of the heterogeneous devices. An association module to fuse data of multiple different formats sensed from each of the heterogeneous devices and to send the fused data to the multi-mode fusion module. A fusion track data file to store prior fused data to enable the multi-mode fusion module to send cueing information based upon the stored prior fused data to the heterogeneous devices.

20 Claims, 13 Drawing Sheets

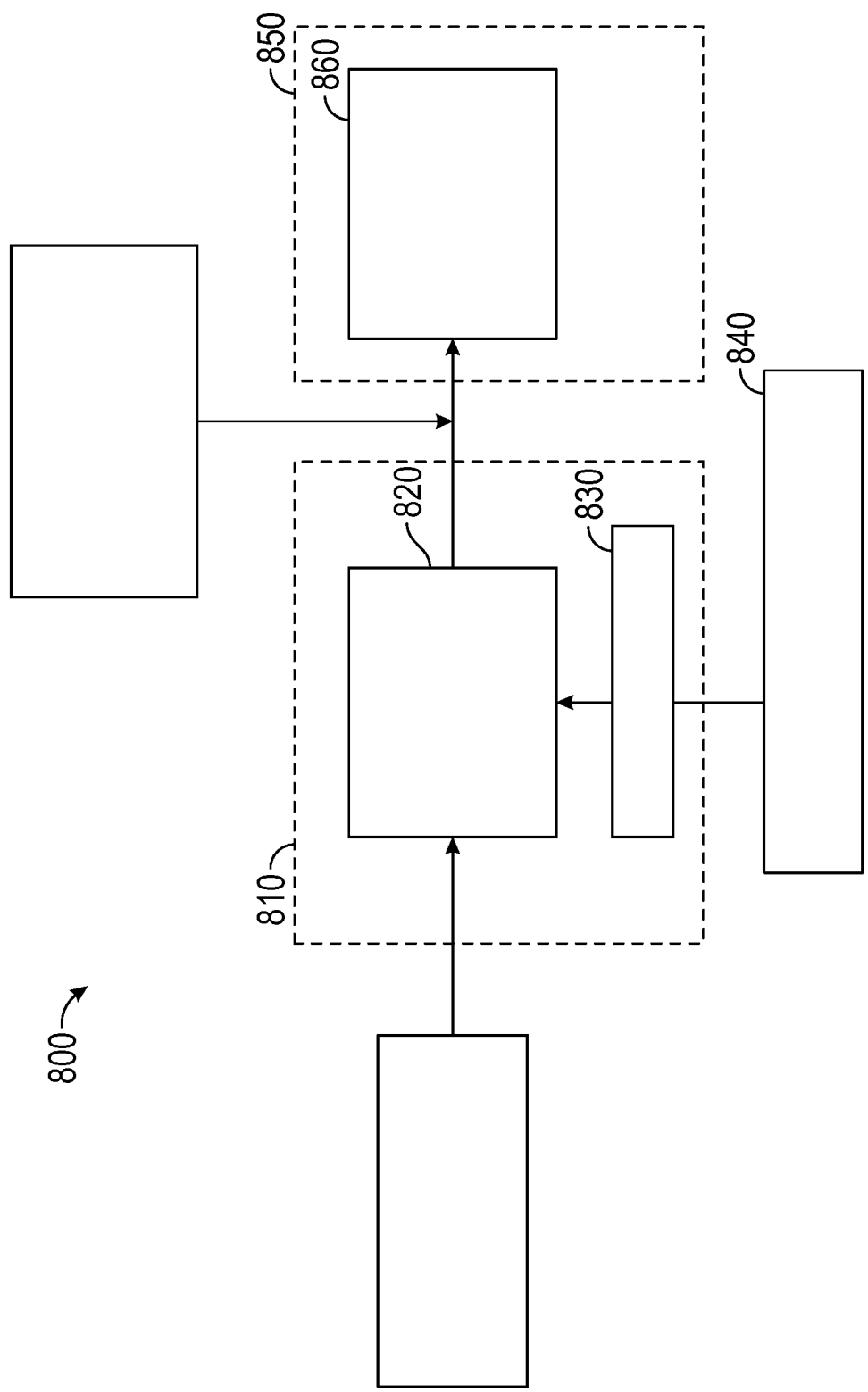

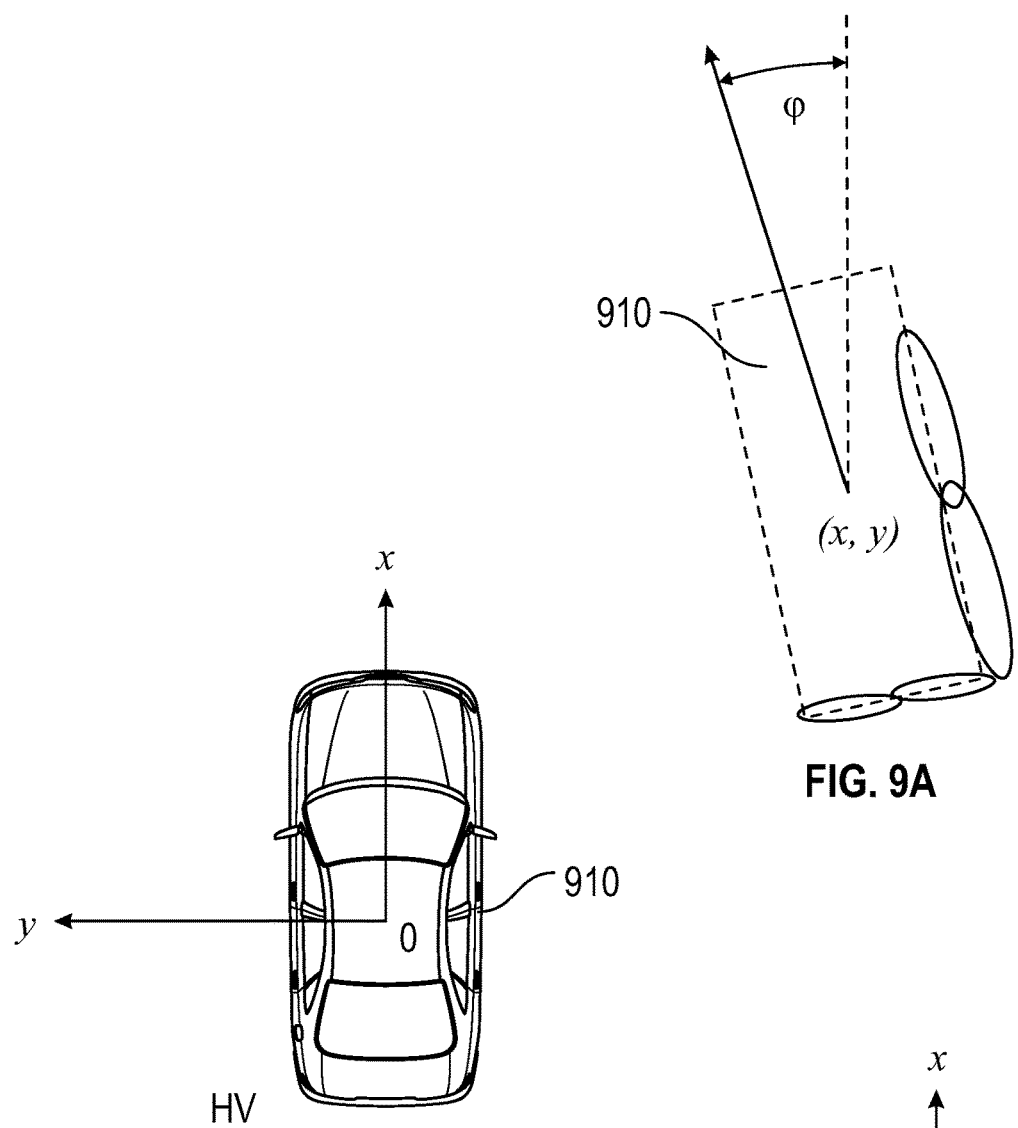
FIG. 9A
FIG. 9B
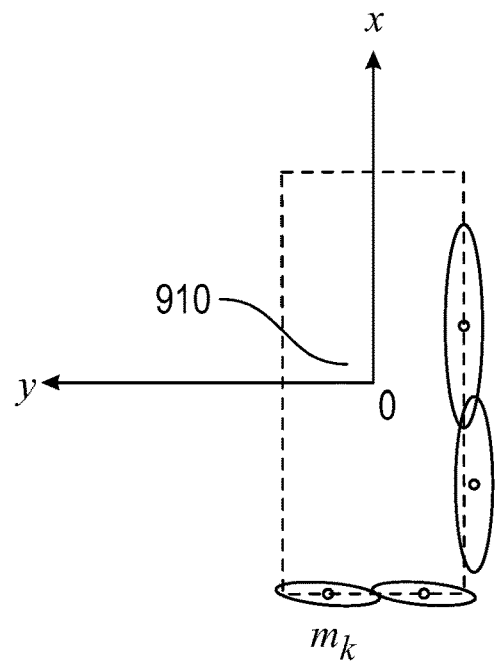
FIG. 9C

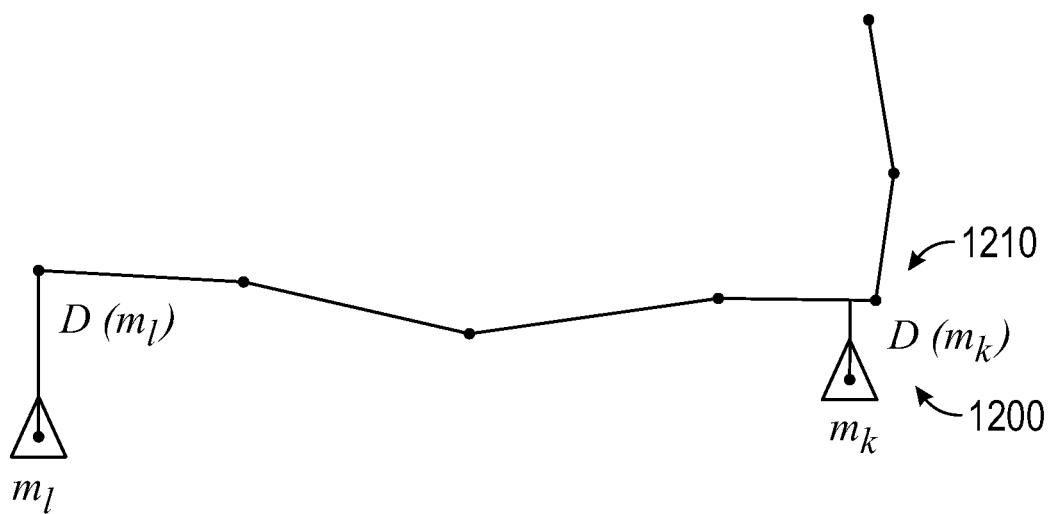
FIG. 12A
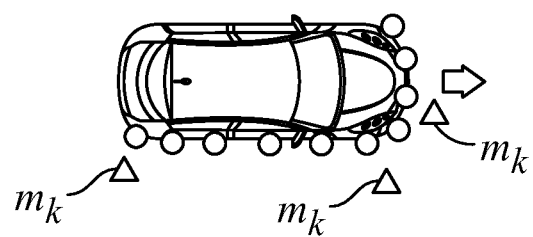
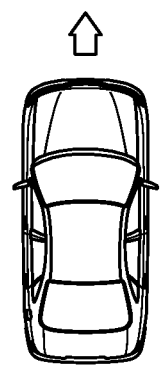
FIG. 12B

APPARATUS, METHOD AND SYSTEM FOR MULTI-MODE FUSION PROCESSING OF DATA OF MULTIPLE DIFFERENT FORMATS SENSED FROM HETEROGENEOUS DEVICES

INTRODUCTION

The present system generally relates to the field of data fusion and more particularly relates to an apparatus, method and system for hybrid data fusion to fuse data of multiple different formats by centralized data fusion processing and to send the fused data by distributed data processing to a set of heterogeneous sensor devices.

Sensor data fusion plays an integral role with advanced sensors in passenger and commercial vehicles. A single stand-alone sensor has limitations in range and field of view and may fail to provide adequate and reliable 360-degree coverage. In order to overcome the limitations of singular sensors, multiple sets of heterogeneous sensors are employed to sense and to provide an increased view and range of data about the driving surroundings. Hence, in the automotive field there are employed many heterogeneous onboard sensors, e.g. GPS, FM-CW LIDAR "light detection and ranging" radars, pulse and FSK radars, and CCD's, CMOS, or other camera/video image modules sensors to provide more data and reliable 360-degree coverage about the driving environment.

Accordingly, it is desirable to have a hybrid centralized and distributed architecture to fuse the data generated by the heterogeneous sensors and capable of processing the multiple different format sensor data received from the heterogeneous devices efficiently at a hybrid internal centralized and distributed processing hub. In addition, other benefits may be derived by the data fusion as fusing the sensed data coming from different heterogeneous sensors not only broadens data coverage about conditions surrounding a vehicle but also increases the reliability of the whole sensing system in case of singular or multiple sensor failures. That is, the fused data provides overlapping or redundant data for processing from the multiple sensors which allows for integrity checks of the received data.

In addition, it is desirable to use prior fused data stored in a fusion track data file from the heterogeneous sensors for generating enhanced cueing solutions from the prior fused data to be distributed to individual sensors for noise filtering, adjusting sensor detection thresholds as well as other adjusting other sensors attributes thereby effectively increasing sensor accuracy and reliability.

In addition, it is desirable to utilize a multi-level module scheme for each of the heterogeneous sensors to fuse multiple data types received using a block, feature and sensor level processes.

In addition, it is desirable to generate fusion contour models for enhancing measurements received from the heterogeneous sensors to the multi-mode fusion module for improved sensor accuracy.

Furthermore, other desirable features and characteristics of the present disclosure will become apparent from the subsequent detailed description of the apparatus and the appended claims, taken in conjunction with the accompanying drawings and the background of the apparatus.

SUMMARY

An apparatus is provided for hybrid multi-mode data fusion. The apparatus comprises a multi-mode fusion module configured to operate in a first mode to receive fused data of multiple different formats sensed from a set of heterogeneous devices and configured to operate in a second mode to send the fused data to each of the heterogeneous devices and an association module to fuse data of multiple different formats sensed from each of the heterogeneous devices and to send the fused data to the multi-mode fusion module; and further a fusion track data file to store prior fused data to enable the multi-mode fusion module to send cueing information based upon the stored prior fused data to the heterogeneous devices.

A method is provided for hybrid multi-mode data fusion. The method comprises operating in a bottom-up mode to fuse data sensed from a set of heterogeneous devices and operating in a top-down mode to distribute fused data to a set of heterogeneous devices and further storing prior fused data received from the heterogeneous devices to generate predictive data based upon stored prior fuse data received to distribute to the heterogeneous devices for enhancing sensing capabilities.

BRIEF DESCRIPTION OF THE DRAWINGS

The present disclosure will hereinafter be described in conjunction with the following drawing figures, wherein like numerals denote like elements.

FIG. 8 is a functional block diagram illustrating a track-level sensor processing diagram of the multi-mode fusion system according to an exemplary embodiment;

FIGS. 9A, 9B, and 9C is a diagram illustrating a contour model diagram for the multi-mode fusion module system according to an exemplary embodiment;

FIGS. 12A, 12B, and 12C are functional block diagrams illustrating a diagram of a radar raw track association with target contour fusion of the multi-mode module system according to an exemplary embodiment;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, a brief summary or the following detailed description.

Techniques and technologies may be described herein in terms of functional and/or logical block components, and with references to symbolic representations of operations, processing tasks, and functions that may be performed by various computing components or devices. Such operations, tasks, and functions are sometimes referred to as being computer-executed, computerized, software-implemented, or computer-implemented. Moreover, the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. As used herein, the term module refers to any hardware, software, firmware, electronic control component, processing logic, and/or device, individually or in any combination, including without limitation: application specific integrated circuit (ASIC), an electronic circuit, a module (shared, dedicated, or group) and memory that executes one or more software or firmware programs, a combinational logic circuit, and/or other suitable components that provide the described functionality.

Figure 1:
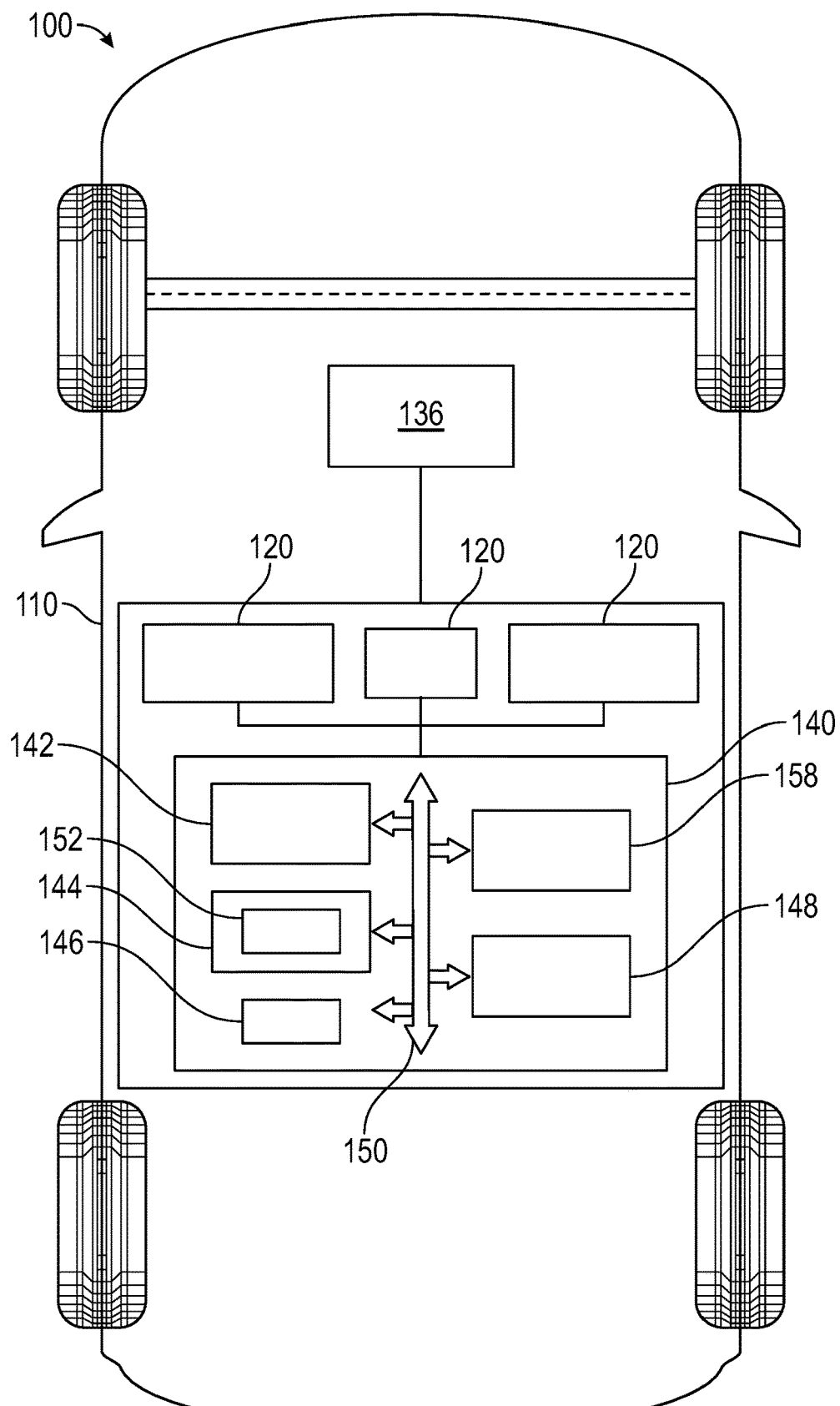
FIG. 1 is a functional block diagram illustrating a sensor management system in a vehicle, in accordance with various exemplary embodiments.

With a reference to FIG. 1, a vehicle 100 having a multi-mode fusion system 110 is shown in accordance with exemplary embodiments. The vehicle 100 includes a plurality of sensors 120, and a multi-mode fusion module 140 of the multi-mode fusion system 110. The sensors sense observable conditions of the vehicle 100 and can include, but are not limited to, image sensors, LIDAR sensors, and radar sensors. Generally, each sensor of the plurality of sensors is specifically is coupled to the multi-mode fusion module 140 of the vehicle 100 and configured to sense external surroundings of the vehicle 100. The multi-mode fusion module 140 receives sensors signals generated by the sensors 120, processes the sensor signals to obtain sensor data, and fuses the sensor data. In various embodiments, the multi-mode fusion module 140 fuses the sensor data based on centralized and multi-mode processing methods and systems disclosed herein. Although the depicted embodiment realizes the mobile platform as a vehicle 100, the concepts presented here can be deployed in other mobile platforms, such as aircraft, spacecraft, watercraft, motorcycles, robots, robotic devices, and the like. Moreover, the concepts presented here may also be deployed in non-mobile platform applications, if so desired.

As mentioned, the vehicle 100 generally includes a plurality of sensors 120, devices, and software, sufficient for sensing information, converting the sensed information into digital information, and providing the digital information to the multi-mode fusion module 140. Generally, each sensor of the plurality of sensors is configured to sense aspects of the surroundings of the vehicle 100.

The multi-mode fusion system may be coupled to a transceiver 136 which may include at least one receiver and at least one transmitter that are operatively coupled to the processor 142. The transceiver 136 can enable the multi-mode fusion module 140 to establish and maintain the communications links to onboard components and external communication sources, including wireless communication. The transceiver 136 can perform signal processing (e.g., digitizing, data encoding, modulation, etc.) as is known in the art. In some embodiments, the transceiver 136 is integrated with the multi-mode fusion module 140.

With continued reference to FIG. 1, the components of the multi-mode fusion module 140 and their functions are described. In the depicted embodiment, the computer system of the multi-mode fusion module 140 includes a processor 142 communicatively coupled to a memory 144, an interface 146, a storage device 148, a bus 150, and an optional storage disk 158. In various embodiments, the multi-mode fusion system 110 (and more specifically, the multi-mode fusion module 140) performs actions and other functions described further below in connection with FIG. 2. The processor 142 performs the computation and control functions attributed to the multi-mode fusion module 140, and may comprise any type of module or multiple modules, single integrated circuits such as a micro module, or any suitable number of integrated circuit devices and/or circuit boards working in cooperation to carry out the described operations, tasks, and functions by manipulating electrical signals representing data bits at memory locations in the system memory, as well as other processing of signals.

During operation, the processor 142 loads and executes one or more programs, algorithms and rules embodied as instructions and applications 152 contained within the memory 144 and, as such, controls the general operation of the control system 130 as well as the computer system of the multi-mode fusion module 140. In executing the processes described herein, the processor 142 loads and executes at least a program 156.

A computer readable storage medium, such as a memory 144, a storage device 148, or an optional storage disk 158 may be utilized as both storage and a scratch pad. The memory locations where data bits are maintained are physical locations that have particular electrical, magnetic, optical, or organic properties corresponding to the data bits. The memory 144 can be any type of suitable computer readable storage medium. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced instructions and applications 152 along with one or more configurable variables in stored values 154.

The storage device 148 is a computer readable storage medium in the form of any suitable type of storage apparatus, including direct access storage devices such as hard disk drives, flash systems, floppy disk drives and optical disk drives. In one exemplary embodiment, the storage device 148 comprises a program product from which memory 144 can receive a program 156 that executes one or more embodiments of one or more processes of the present disclosure. In another exemplary embodiment, the program product may be directly stored in and/or otherwise accessed by the memory 144 and/or a disk (e.g., optional storage disk 158), such as that referenced below.

The prior fused data of the tack data files may be stored in the computer readable storage medium, such as the memory 144, the storage device 148, or the optional storage disk 158. The bus 150 serves to transmit programs, data, status and other information or signals between the various components of the computer system of the multi-mode fusion module 140. The bus 150 can be any suitable physical or logical means of connecting computer systems and components. This includes, but is not limited to, direct hard-wired connections, fiber optics, infrared and wireless bus technologies. During operation, the program 156, stored in the memory 144, is loaded and executed by the processor 142.

The interface 146 enables communication within multi-mode fusion module 140, for example from a system driver and/or another computer system, and can be implemented using any suitable method and apparatus. In one embodiment, the interface 146 obtains data from the sensors 120 and/or the transceiver 136. The interface 146 can include one or more network interfaces to communicate with other systems or components. The interface 146 may also include one or more network interfaces to communicate with technicians, and/or one or more storage interfaces to connect to storage apparatuses, such as the storage device 148.

Figure 2:
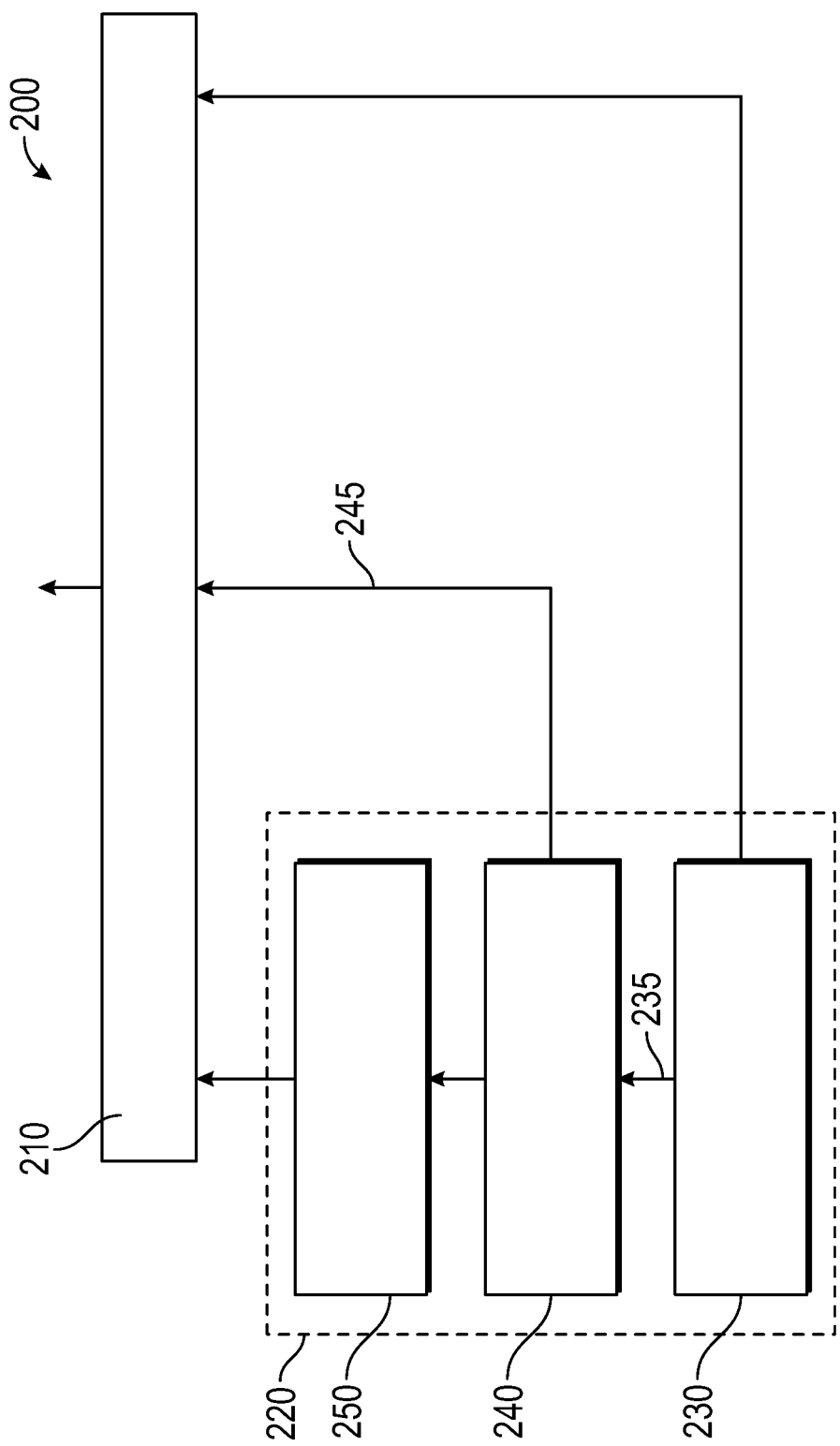
FIG. 2 is a functional block diagram illustrating a multi-level fusion diagram of an object-level, a feature-level and a sensor-level module coupled to the multi-mode fusion system according to an exemplary embodiment.

With reference now to FIG. 2 and with continued reference to FIG. 1, FIG. 2 illustrates a multi-level fusion system 200 having a centralized fusion system 210 and a hierarchical hybrid system 220 for each of the sensors 120 of FIG. 1. The multi-level fusion system 200 transforms sensor data to convenient coordinate data for data fusion. The multi-level fusion system 200 uses algorithmic solutions for transforming sensor data and to create higher level data representations such as fused object lists, occupancy grids, and fused stixels used in scene understanding tools. In addition, template matching and semantic labeling may be employed to provide semantic understanding of external driving surrounding representations from derived data from the sensor, feature and object processing levels. In various embodiments, the hierarchical hybrid system 220, includes a sensor level processing module 230, a feature-level processing module, and an object-level processing module 250.

Initially, the heterogeneous sensors (sensors 120 of FIG. 1) such as a camera, LIDAR, Radar, V2X, crowd source etc. generate sensor signals that are processed by the sensor level processing module 230 to obtain binary data, which is referred to as sensor-level data of a target of interest. This sensor-level data is the lowest level data and includes RGB pixels, 3D voxels, radar point detection w/confidence attributes range, velocity, angles, RCS, direction of motion, stationary tags etc. This sensor-level data module is sent directly to the centralized fusion system 210 for data fusion processing and for further storing in track data files. In addition, the sensor level data 235 is forwarded to the feature level processing module 240 for further feature level processing. The centralized fusion system 210 may use association strategies involving gating techniques and assignment strategies for fusing the various sensor level data received.

In addition, the sensor data may be retained in fused track data files or other similar type of data structure for later use and fused data distribution to the other heterogeneous sensors. In other words, sensor level data from particular sensors may be converted and stored for crossover use by other heterogeneous sensors by the multi-mode fusion system. Also, filtering and cueing methodologies may also occur, where fused data tracks are filtered and outputted in a distributed fusion scheme by a track-to-track association procedure to the set of heterogeneous sensors.

Next, the feature level processing module 240 receives the sensor level data 235 and generates feature maps, super-pixels, stixels, and tracklets 245 from the received sensor level data 235. In other words, features are ascertained by pixel level processing using algorithmic solutions from the binary sensor level data to determine feature maps, stixels, tracklets and other similar methodology and to group and ascertain the pixel data in order to provide representations of the driving surroundings. In one instance, in a multi-level representation of external surroundings, when finer granularity of images is required; stixel and grid methodology can be used for representing suburban and urban scenes. In other instances, stixels and free space grids are used for rural obstacles. In addition, stixels may also be used to represent targets in the surrounding environment. Finally, point cloud representation can be used for static obstacles.

Object level processing 250 is the final level of the hierarchical hybrid system 220 and is directed to estimations of physical objects using algorithmic solutions. This object level processing may be carried out by the centralized fusion system 210 or in other instances not shown may be performed externally by modules of other sensor devices. That is, in some instances, object detection is performed in a distributed manner by heterogeneous sensors and not by the centralized fusion system 210. Nevertheless, in both instances, the centralized fusion system 210 is configured to receive the object level data of object lists, attributes and occupancy grid 260 information for further processing. Object lists may include lists of pedestrian, vehicle physical objects and attributes may include object attributes of velocity, distance from the camera etc. In addition, classification and motion estimation may be performed by algorithms of the centralized fusion system 210. Also, road geometry estimations and other higher level predictions may be performed during object detection by the centralized fusion system 210. Hence, the centralized fusion system 210 can use and combine the sensor, feature, and object level data of the target of interest to obtain states of the target of interest within external environment representations.

Figure 3:
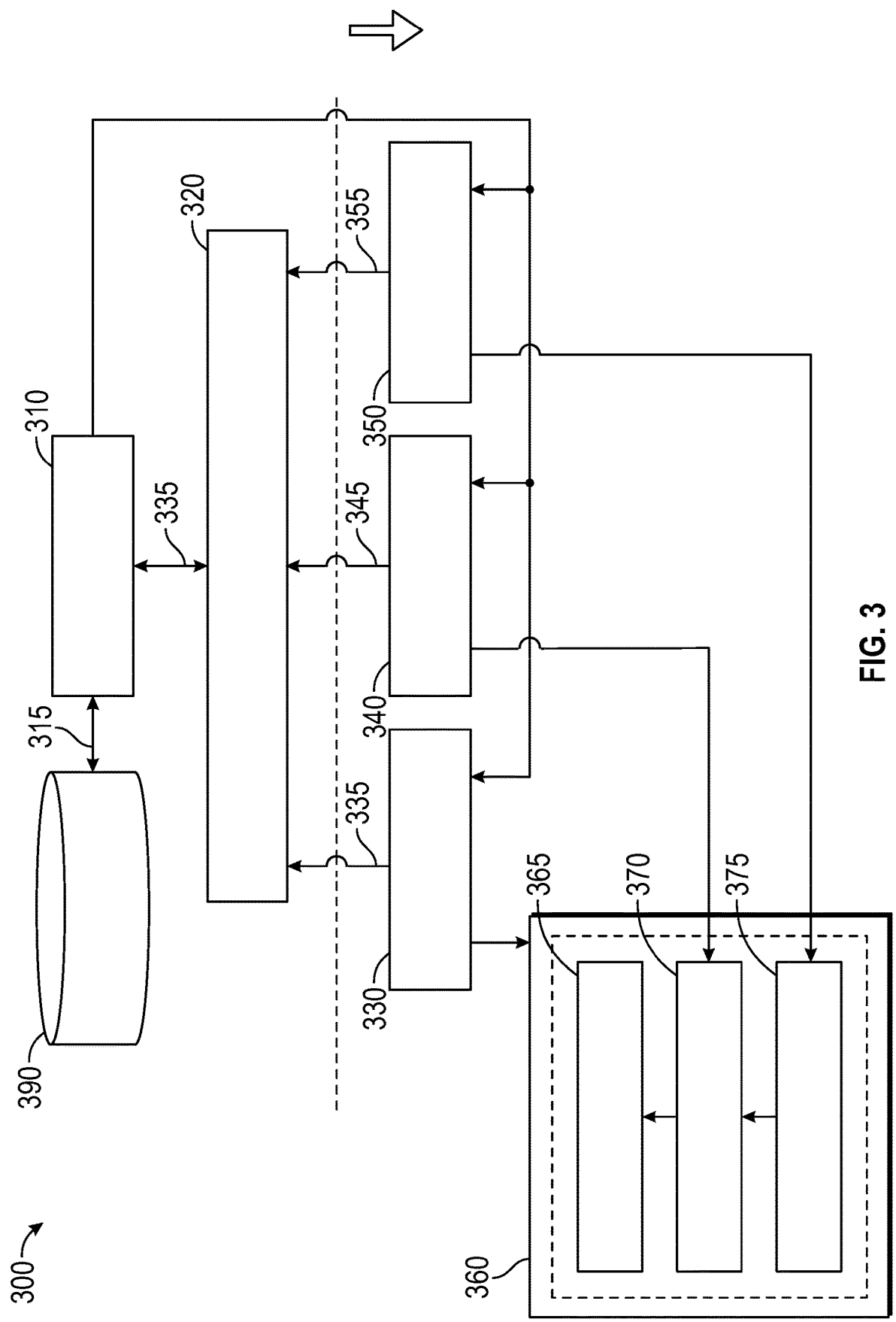
FIG. 3 is a functional block diagram illustrating a hybrid centralized and distributed architecture diagram of the multi-level bottom-up and top-down fusion processing of the multi-mode fusion system according to an exemplary embodiment.

With a reference to FIG. 3 and continued reference to FIG. 2, FIG. 3 illustrates a hybrid centralized and distributed architecture diagram of the hybrid data fusion system 300 using a multi-mode fusion module 310 where the vision 330, radar 340, and LIDAR 350 sensors modules each having multi-level fusion modules 360 for processing sensed data. The multi-level fusion modules 360 includes at least but not limited to object-level modules 365, feature level modules 370 and sensor level modules 375 for object, feature and sensor level processing as previously illustrated in FIG. 2. The multi-level processing of the vision 330, radar 340, and LIDAR 350 sensors modules is sent to the association and alignment correction module 320 for further processing. In other words, the association and alignment correction module 320 is configured to receive multi-level sense data for processing.

Next, the hybrid data fusion system 300 involves both the centralized and distributed architectures based on the disposition of the multiple sets of heterogeneous sensors. For example, in operation of the system, distributed fusion architecture is used to reduce computational processing and communications however when more accuracy is needed, centralized fusion architecture is used. Alternatively, based on the heterogeneous sensors available a combination of both operational modes maybe used to obtain a fused state of a target of interest. As explained, in instances where the processing modules of each of the sensors are enhanced with track data about cueing information of the sensor operation, a centralized fusion mode of operation is used to generate the cueing information to be sent to the sensor modules. That is, the cueing information is centrally generated by algorithmic solutions of the multi-mode fusion module 310 from prior historic track data of a fusion track file 390 stored locally, remotely or by cloud. A distributed operation is used for calibration of each of the heterogeneous where the cueing information is independently processed in a distributed scheme individually by signal processers of each sensor.

Additionally, the hybrid centralized and distributed fusion architecture enables the multi-mode fusion module 310 to be configured to operate in a dual mode of processing operation, in which in one mode there is a top-down process flow were fused track data which contains cueing information is sent to the heterogeneous sensors. The cueing information may include data of about a fusion target, contour position, and velocity and this cueing information is sent by using a feedback path directly from the multi-mode fusion module 310 to each of the heterogeneous sensors utilizing a multi-path information flow were signal modules using algorithmic solutions of each of the heterogeneous sensors process the sent information to aid in the calibration or bias correction of the individual sensor during real-time operation. For example, the cueing information contained in the fused track data sent may be further processed by each sensor signal module to adjust filtering schemes and detection threshold levels of the sensors; and, to estimate sensor alignment and measurement bias.

As mentioned, the multi-mode fusion module operates in a dual mode processing operation in which in the second mode there is a bottom-up process flow were binary data or sensor level data shown in FIG. 3 is detected or sensed by each of the heterogeneous sensors. For example, the vision sensor 330 may detect binary data of RBG pixels, range rate, bearing, bearing rate 335 etc. . . . which is sent to the association and alignment correction module 320. The radar sensor 340 likewise detects binary data but of range, range rate, bearing angle 345 which is also sent to the association and alignment correction module 320. Finally, the LIDAR sensor 350 detects binary data of point clouds 355 which again is sent to the association and alignment correction module 320.

The association and alignment correction module 320 uses parametric association and data alignment correction solutions to aggregate and combine the sensor, feature, and object level data of a target of interest from each of the heterogeneous sensors. To perform such associations, data association techniques may be employed including correlation, distance measurements, and probabilistic similarities.

Alignment corrections can be detected by target tracking from data of the multiple sensors. For example, in the case of vision misalignment, a process can be set up to align the vision sensors based on frame coordinates and angle estimations of headings of the target of interest; mismatching angle data which fails to correlate with the angle estimations are removed and corrections can be made to the vision alignment. In addition, angle corrections can be made based on prior angle information, this would result in incremental changes in the alignment. Hence, in this instance, cueing information is based on historical angle data.

Figure 4A:
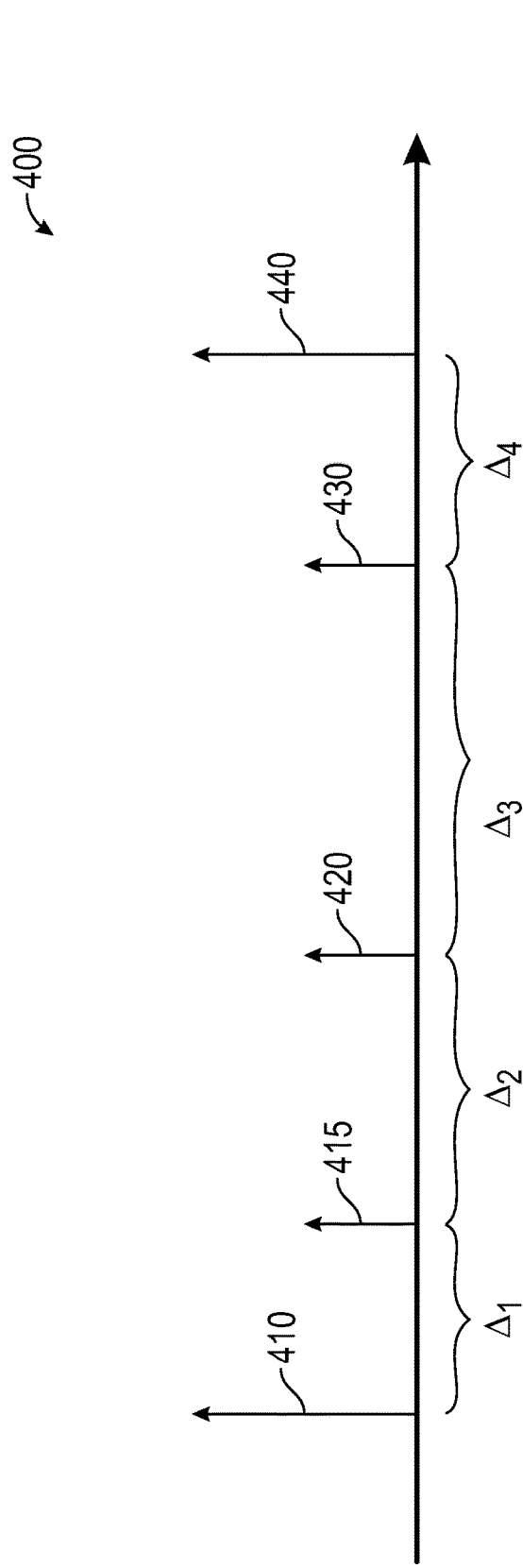
FIG. 4A is a time-line illustrating a multi-modality temporal fusion time-line of the centralized fusion architecture according to an exemplary embodiment.

With a reference to FIG. 4A and continued reference to FIG. 3, FIG. 4A illustrates a multi-mode temporal fusion timing timeline of timings 400 of events of the multi-mode fusion module received during operation. The multi-mode fusion module operates in a multi-mode centralized data fusion scheme to fuse data from the heterogeneous sensors which require time synchronization of event driven actions from the heterogeneous sensors. However, such events which are sensed by the heterogeneous sensors even when the heterogeneous sensors operate at the same frequency may not be synchronized. Hence, techniques are used by algorithms of the multi-mode fusion module to adjust operation of the multi-mode fusion module when receiving asynchronous sensor data from the heterogeneous sensors. In a single event, driven data fusion scheme vision sensor data, LIDAR sensor data and radar sensor data are received from the set of heterogeneous devices provided that there are sensors operational related to these functions. The sensor data which is processed by each of the sensors is performed independently and in a distributed manner. In other words, modules of the heterogeneous sensor while are initially timed to operate in sync and process the sensed data and any additional received data synchronously may not actually be synchronized. That is, due to the distributed architecture and independent data processing on the part of each of the sensors there can, in instances, be changes in the amount of fused data received by each of the sensors during cueing operations. This can result in timing deviations of the completion of processing of the data by each heterogeneous sensor during a cycle and the subsequent receipt of the sensed data by the fusion system.

In the initial cycle $t_0$ a common time stamp is generated for the arrive time of each sensor data. This common time stamp can be generated because all the sensor data arrives in one cycle and therefore an initial timing map of arrive time of the sensor data can be generated. However, there are events that may result in deviations of initial $t_0$ mapping scheme. The fusion system compensates for these events by using algorithms to predict changes $\Delta_{[1 \ldots 4]}$ in data arrival time of the processed data from each of the sensors. For example, at the start of the cycle t 410 to the subsequent t+1 440 cycle a prediction $\Delta$ is calculated for each subsequent sensor data arrival time. Initially, prediction $\Delta_1$ for data arrival time for the vision sensor is calculated which results in the vision data correction time 415. Next, prediction $\Delta_2$ is calculated for the LIDAR data correction time and this $\Delta_2$ is offset from the vision data correction time 415, followed by the subsequent radar data correction $\Delta_3$ 320 similarly offset from LIDAR data correction time 420, and finally a prediction $\Delta_4$ is calculated for the next fusion output cycle t+1. Hence, a delta prediction correction $\Delta_{[1 \ldots 4]}$ are propagated throughout the entire cycle offsetting the prior arrival time prediction for each sensors process data arrival time. Hence, by using this prediction scheme, there are no delays occurring in the processing cycle that may have occurred if arrival time deviated as in the case when using only timer based calculations.

Figure 4B:
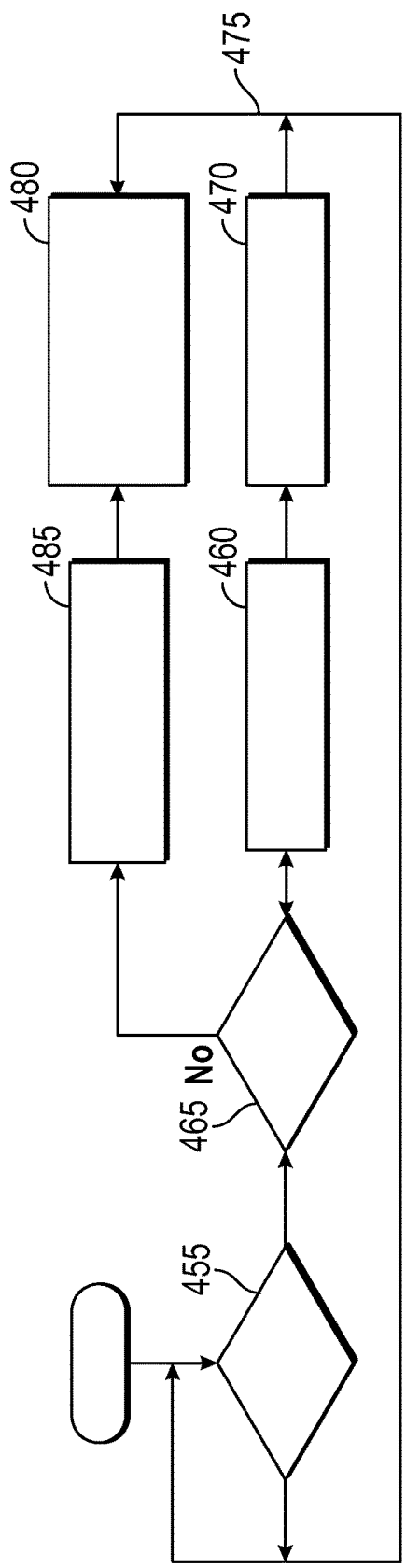
FIG. 4B is a functional block diagram illustrating a multi-modality temporal fusion scheme diagram of the centralized fusion architecture according to an exemplary embodiment.

In reference to FIG. 4B and in continued reference to FIG. 4A, FIG. 4B illustrates a multi-modality temporal fusion diagram of the multi-mode fusion system 450 of the event arrival and subsequent prediction calculation after the fusion output 465. Initially a determination 455 of an event arrival time occurs. If there is determined to be not to be an event arrival time "N" then the process flow reverts to the start. This occur when there is temporal persistence of the sensed data of the detected object of interest. As an example, if there is infinitesimal change of the sensor data then additional detection is not needed as the object of interest attributes would have not changed from the prior stored sensor data about the object. Next, if there is a fusion output 465 then prediction 460 $\Delta_{[1 \ldots 4]}$ are calculated but no vision, LIDAR or radar data correction is needed so the sensed data is outputted. Alternately, if there is no fusion output 465 is determined, then additional fused data is needed and additional correction by prediction 485 of the vision, LIDAR and radar data are needed 380. Both these parallel processing paths are returned by feedback path 475 for the next event arrival. By using this heterogenetic modality scheme, less data is aggregated and overall performance of the fusion system is enhanced.

Figure 5:
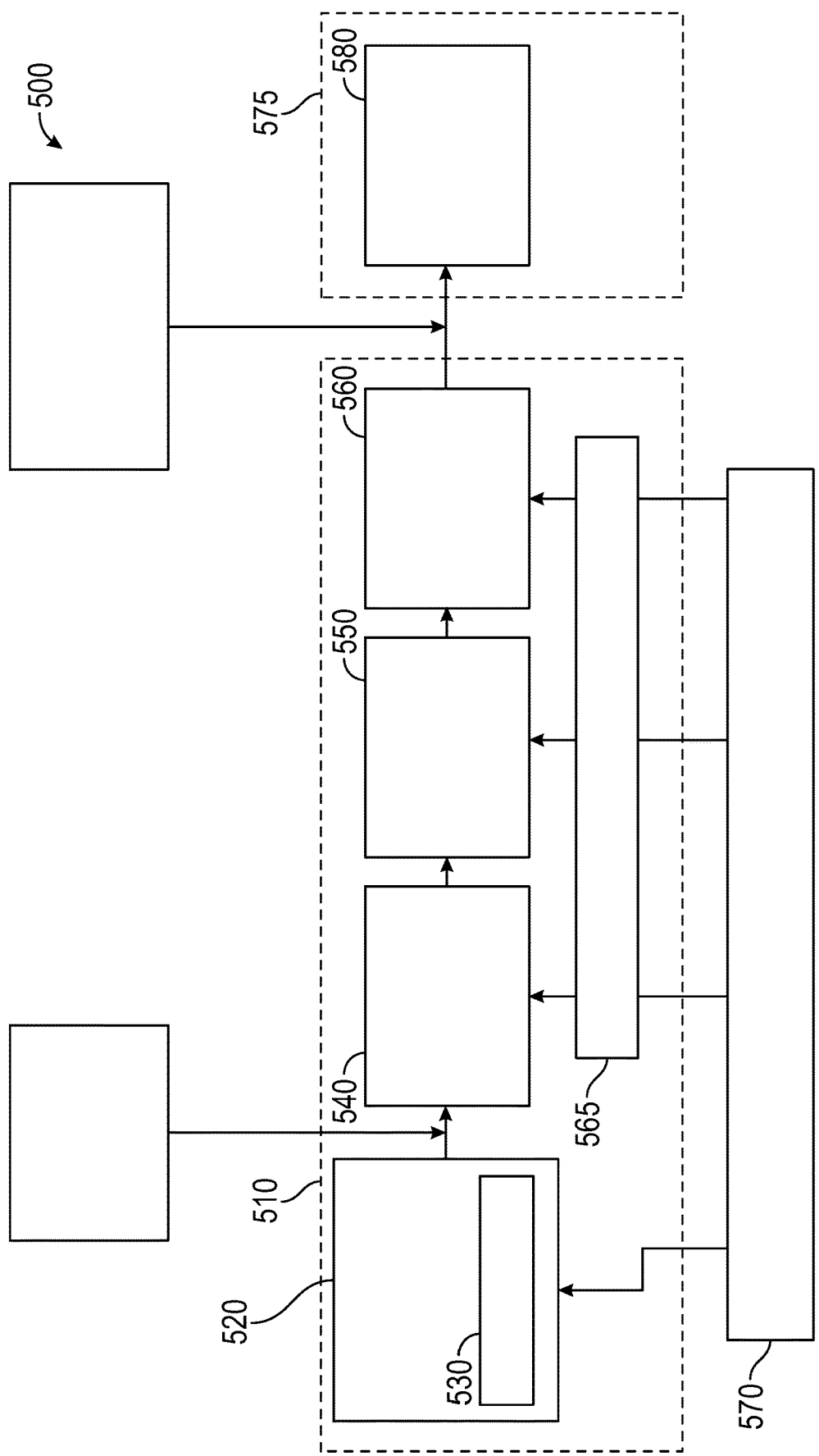
FIG. 5 is a functional block diagram illustrating a radar processing diagram of the radar processing system of the multi-mode fusion system according to an exemplary embodiment.

With a reference to FIG. 5, FIG. 5 illustrates a radar processing system diagram of the radar sensor system 500 of the radar module 510 of the multi-mode fusion system. In operation, the radar module 510 obtains a constant false-alarm rate CFAR from the radar object detector 520 in which an adaptive threshold 530 is applied reflecting the surrounding clutter and noise. The radar object detector 520 compares a received signal amplitude to an adaptive threshold 530 which is adjusted from cueing processes based on predicted fused data 570 containing prior threshold information which is distributed to the radar object detector 520 from the fusion system.

Next, the radar object detector 520 outputs sensed data of radar points, range, and angle rate for further processing along the pipeline. In the next stage 540, the sensed data is cleaned and noisy objects are removed. The noisy objects, specifically points of the noisy objects, are removed by use of previous noisy point data gleaned from temporal persistency through data association 565 from cueing of received predicted fused data 570. In the next stage, 550 along the radar sensor processing pipeline, alignment and bias correction are performed of the sensor again gleaned from data association 565 from cueing processes of received predicted fused data 570. At the final stage of the radar sensor processing pipeline 560 data classifiers for classifying radar point into stationary or dynamic point sets is performed. The filtered data points are processed additionally by data association 565 with fusion data tracks and forwarded to the fusion module 575 and resulting in updates of measurement of the fusion data tracks by the fusion track measurement and update module 580 for the target of interest.

Figure 6:
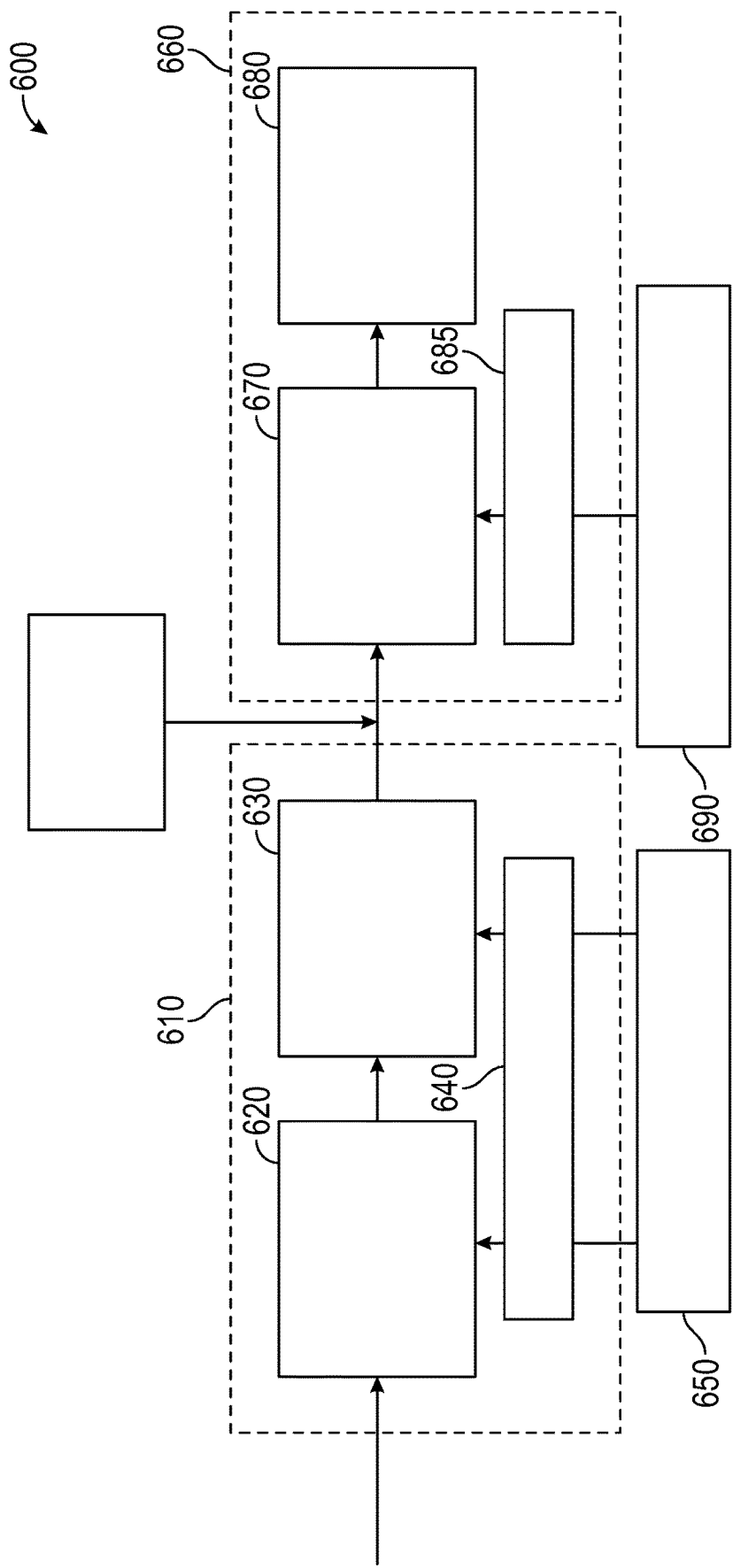
FIG. 6 is a functional block diagram illustrating a LIDAR processing diagram of the LIDAR processing system of the multi-mode fusion system according to an exemplary embodiment.

With a reference to FIG. 6, FIG. 6. illustrates a LIDAR processing diagram of the LIDAR processing system 600 of the multi-mode fusion system upon the arrival of point cloud data. Point cloud data x,y,z is supplied to the LIDAR module 610 for processing for determinations about a target of interest. The sensed LIDAR point data is processed in two stages, initially in the first stage 620 estimation algorithms are used for correction of the LIDAR alignment and bias. In the subsequent stage 630 algorithms are applied to make threshold estimations for removal of ground points from the point cloud data. Both stages receive non-ground point data from tracks of the fusion data. These non-ground points are discerned by data association 640 of the non-ground LIDAR points with the fused data gleaned from cueing of received predicted fused data 680 sent to the data association 640 modules. From the LIDAR module 610, the point cloud x,y,z and fusion track index are sent to the fusion module 660 for further processing. Cueing of current radar points 690 is used to enable conversion of the point cloud data by clustering algorithms 670 into tracklets using the radar points as cueing. The fusion track measurements are updated based on the clustering algorithms. Additionally, data association processes 685 are used to associate the cueing of the current radar points.

Figure 7:
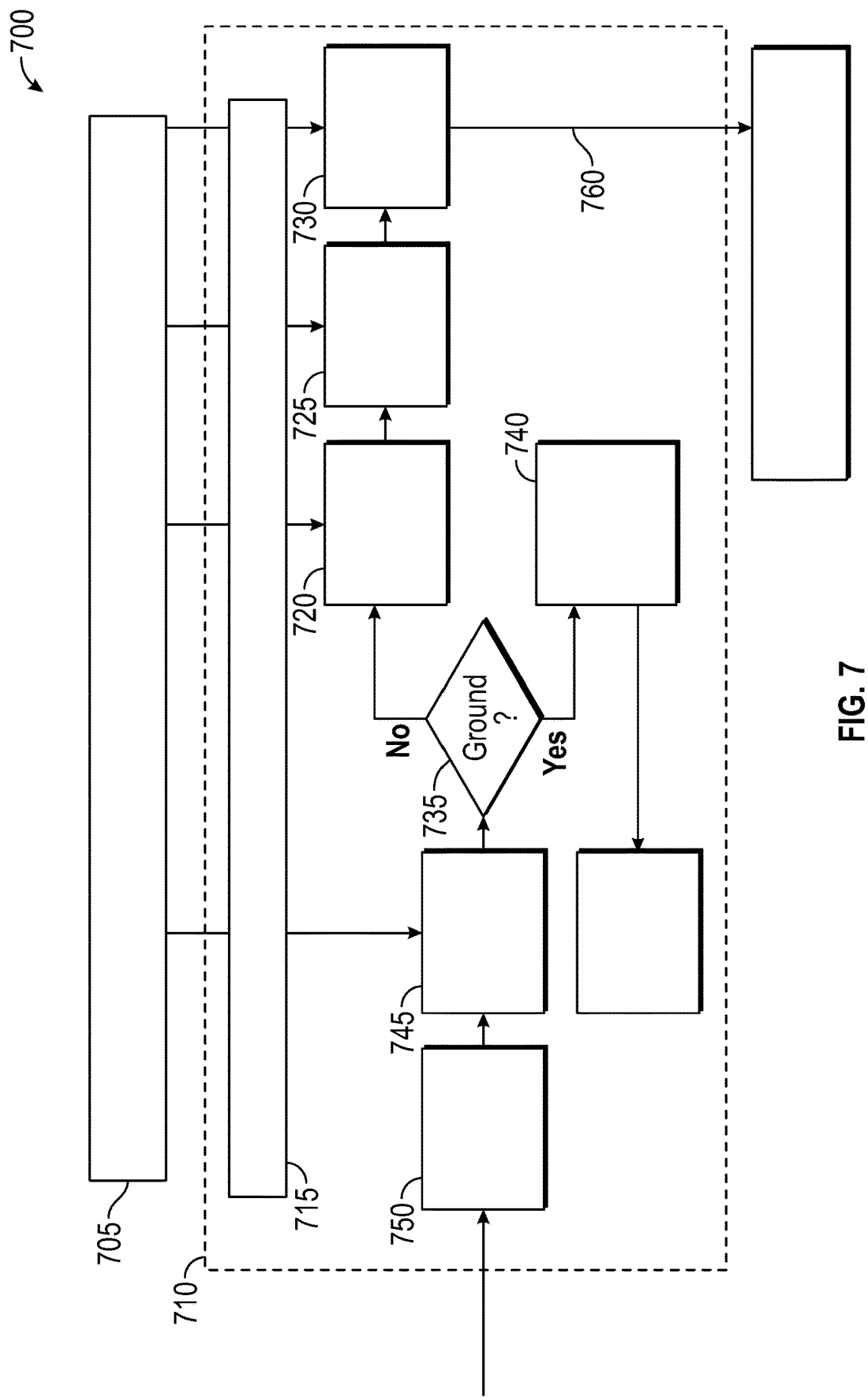
FIG. 7 is a functional block diagram illustrating a vision processing diagram of the vision processing system of the multi-mode fusion system according to an exemplary embodiment.

With references to FIG. 7, FIG. 7 illustrates a vision processing diagram of the vision processing system 700 of the multi-mode fusion system when image data is captured by cameras coupled to the vehicle to generate image data of the vehicle surroundings. Initially, intensity images are received by the vision module 710 for processing with cueing of received predicted fused data 705 for ground pixel detection 745, objection recognition 720, image classification 725 and velocity estimations 730 of the target of interest. Initially, motion estimations computations 750 are made based upon vertical slices of motion flow of super-pixels of the intensity images received. At next stage in the image processing pipeline, ground pixels are detected 745 using cueing of received predicted fused data 705. A determination 735 is made as to whether the pixels are of the ground imagery by comparisons of the data from the predicted fused data 705 and by threshold determinations. If the pixels are of the ground, then computation estimates are performed for camera extrinsic parameters 740 and the camera projection parameters are updated with the estimations. In addition, classifying of the grounds pixels is performed for future use in data extraction. Alternatively, if ground pixels are not detected then objection recognition 720 of the extract object candidate is performed and super pixel segmentation of the object detected is mapped. In addition, classification of the pixels in a subsequent stage are performed and finally velocity estimations 730 of the target of interest or detected object are performed. Both these processes of classification and velocity estimations use predicted fused data gleaned by data association 715 of the predicted fused data 705. Finally, fusion data is updated with object labeling added and motion flow estimations of the image in an image plane 760 for further processing by the fusion module.

With a reference to FIG. 8, FIG. 8 illustrates a track-level sensor processing diagram of the radar sensor system 800 of the multi-mode fusion system. In this example, the radar sensors are equipped with an individual processing module 810 that performs a local tracking. The received frame data information includes range, range rate, azimuth, and azimuth rate of the object of interest. The track level sensing of the radar sensor uses data association of a track data of the radar sensor with the fusion track index 830 from cueing of received predicted fused data 840 estimations to configure the radar sensor system 800 to compute and correct sensor alignment and bias 820. An update of the fusion track state including track data of range, range rate, azimuth, azimuth rate, fusion object index etc. . . . is sent to the multi-mode fusion module 850. The fusion track measurement updates are processed by fusion track measurement update module 860 of the multi-mode fusion module 850. In addition, the track level sensor is configured to enable an objects kinetic states which is the position and velocity of the object of interest and not sensor level binary data or intermediate feature data. Hence, object level data processing is performed by the radar sensor system 800 for the fusion track measurement updates.

With a reference to FIGS. 9A, 9B and 9C, FIGS. 9A, 9B, and 9C illustrate contour model diagrams for LIDAR point clusters of the multi-mode fusion module. Each target of interest 910 are modeled as state variables of a location p=(x,y) which has a heading angle ($\varphi$), a ground speed (v), and a yaw rate ($\omega$). The contour of the target reference of radar point 1020 to target frame is modeled in a Gaussian mixture model "GMM" as follows:

$$p(x) = \frac{1}{M}\sum_{k=1}^{M} g(x; m_k, \sigma_k), \; g(x; m_k, \sigma_k) = ce^{-\frac{\|x-m_k\|^2 b_k'}{2}}$$

and
$\|x-m_k\|_{\sigma_k}^{\square}$ is the Mahalanobis distance
In HV frame, the contour model is $$p(x \mid p, \varphi) = \frac{1}{M}\sum_{k=1}^{M} h(x; m_k', \sigma_k'), \; m_k' = p + R_\varphi m_k,$$

$\sigma'_k = R_\varphi \sigma_k R_\varphi^T$, $R_\varphi$ is rotation matrix of angle $\varphi$ In a prediction mode, the vehicle target of interest 910, is modeled as ordinary differential equations (ODE) as follows:

$$dX(t) = F(X(t))dt + GdW(t)$$

where $X(t) = (x, y, \varphi, v, \omega)$, $$F(X(t)) = (v\cos\varphi + y\omega - v_H, v\sin\varphi - x\omega, \omega - \omega_H, 0, 0), W(t)$$

is mutually independent Brownian process with zero mean and unit variance, and the diffusion matrix G is diagonal.

Given $X(t_0)$, the predicted state $X(t_1)$ at $t_1 = t_0 + dt$ can be approximated in neighborhood of $X_*$ by $$G'X(t_1) = F'X(t_0) + u + w$$
$$G' = G^{-1}$$
$$F' = G^{-1}\left(\frac{\partial F}{\partial X}\bigg|_{X_*}\delta t + I\right)$$
$$u = G^{-1}\left(F(X^*)\delta t - \frac{\partial F}{\partial X}\bigg|_{X_*}\delta t X^*\right)$$

w is a 5×1 zero-mean unit variance Gaussian noise.

Figure 10:
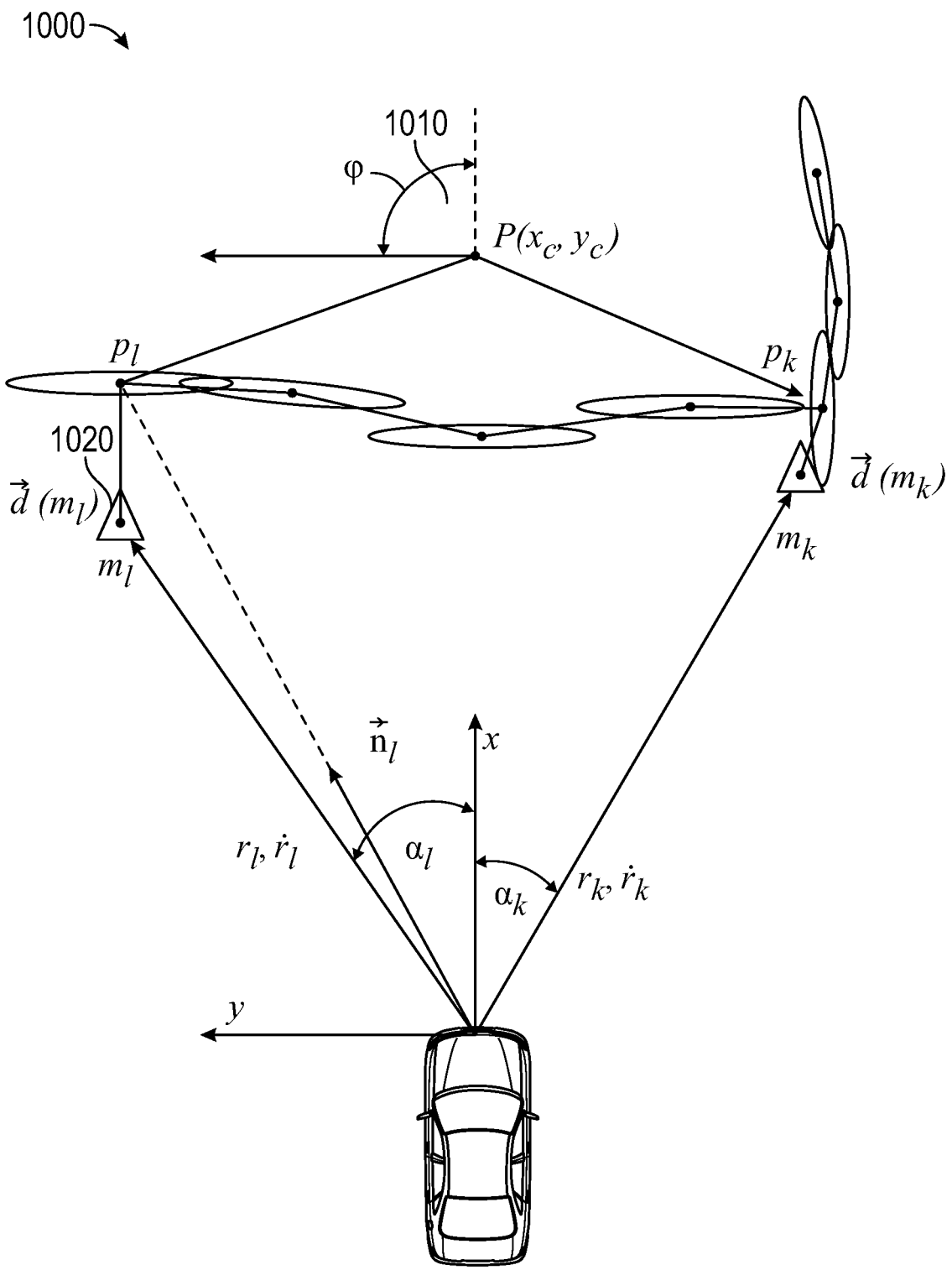
FIG. 10 is a functional block diagram illustrating a multi-modality fusion diagram of the multi-mode fusion module system according to an exemplary embodiment.

With a reference to FIG. 10, FIG. 10 illustrates a multi-mode fusion diagram of the multi-mode fusion system 1000 of the multi-modality fusion algorithm for associating radar points with LIDRA based point contours. A measurement for point cloud correction for each radar point is performed by the multi-mode fusion module and a LIDAR based contour is generated. For each measurement $m_l$, the algorithm for the point cloud correction finds the closest point $p_l$, in the contour to the radar point 1020 shown in FIG. 10. Hence, a radar point 1020 is associated with the Lidar based contour $p_l$.

The linear velocity of point is determined as follows:

$$v_l = p_l \times (\omega - \omega_H) + \begin{bmatrix} v_x \\ v_y \end{bmatrix}$$

and $$\vec{n}_l = \frac{p_l + P}{\|p_l + P\|}$$

The measurement equation is as follows:

$$r_l = \|p_l + P\|$$

$\dot{r}_l = \vec{n}_l \cdot v_l$ only for radar $$\alpha_l = \angle(p_l + P)$$

For all cloud points, an aggregation process is performed by the algorithm for the point cloud correction for all measurement equations and is as follows:

$$\sigma = HX + \varepsilon, \; X = (x_c, y_c, \varphi, v, \omega)$$

Given a prior $X \sim [\hat{R} \; \hat{z}]$,
construct $$\begin{bmatrix} \tilde{R} & \tilde{z} \\ H & O \end{bmatrix},$$

and
a triangular matrix $$\begin{bmatrix} \hat{R} & \hat{z} \\ 0 & e \end{bmatrix},$$

then a posterior is $X \sim [\hat{R} \; \hat{z}]$.
The update estimate is then as follows: $\hat{X} = \hat{R}^{-1}\hat{z}$.

Figure 11A:
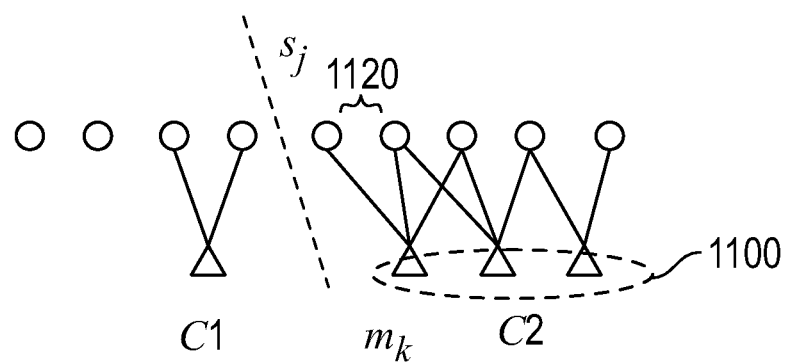
FIGS. 11A and 11B are functional block diagrams illustrating a LIDAR clustering diagram of the multi-mode fusion module system according to an exemplary embodiment.
Figure 11B:
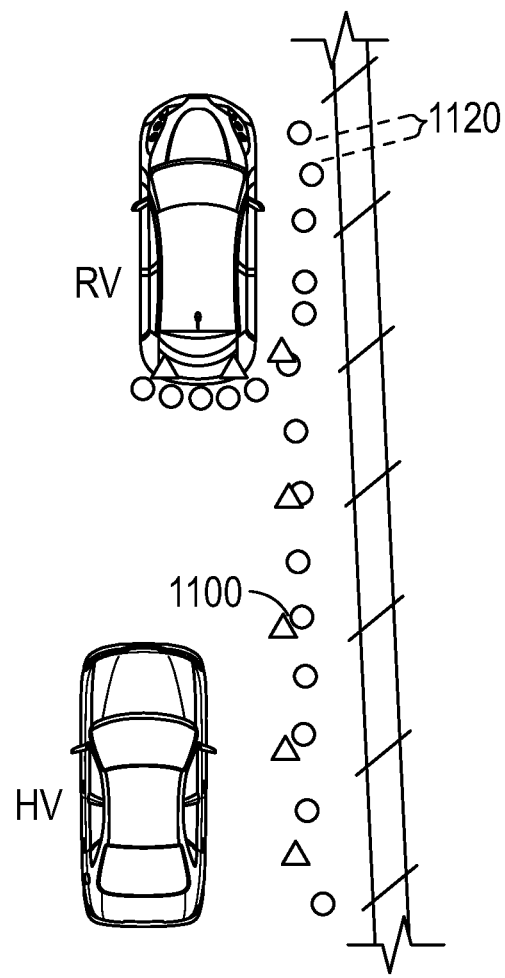

With a reference to FIGS. 11A and 11B, FIGS. 11A and 11B illustrate radar clustering diagrams shown as triangular symbols 1100 of the LIDAR processing algorithm of the radar module of the multi-mode fusion module system. In FIG. 11A and in the alternate representation of the fusion contour points in FIG. 11B there is shown representations of a moving host vehicle HV and the contour fusion points 1110 surrounding the RV remote vehicle. In order to algorithmically distinguish a moving vehicle with a stationary obstacle such as guard rails of the contour fusion points 1110 are calculated.

For each contour fusion point $s_j$ 1110, there is a compute match coefficient to a radar point $m_k$ as $a_{jk}$, $\Sigma_k a_{jk} = 1$ For any two of the contour fusion points 1110 $s_i$ and $s_j$ the augmented distance 1120 $\bar{d}$ is defined as follows:

$$\bar{d}(s_i, s_j) = d(s_i, s_j) + \sum_{l,j} a_{il} a_{jk} C(m_l, m_k)$$

where $d(s_i, s_j)$ is the Euclidean distance or other distance metric between the two LIDAR points, and $C(m_l, m_k)$ is the distance metric between the two radar points, i.e., $C(m_l, m_k)$; this is a large positive number if $m_l$, $m_k$ belong to two separated targets with significantly different Doppler measurements.

Then, by using an augmented distance metric in the calculation, and performing clustering computations which in some instances are graph coloring algorithmic solutions then in such graph coloring algorithmic solutions two contour points which have a distance metric which is less than a threshold; are then assigned to the same cluster, otherwise, the contour fusion points 1110 are assigned to two different clusters C1, C2.

Figure 12C:
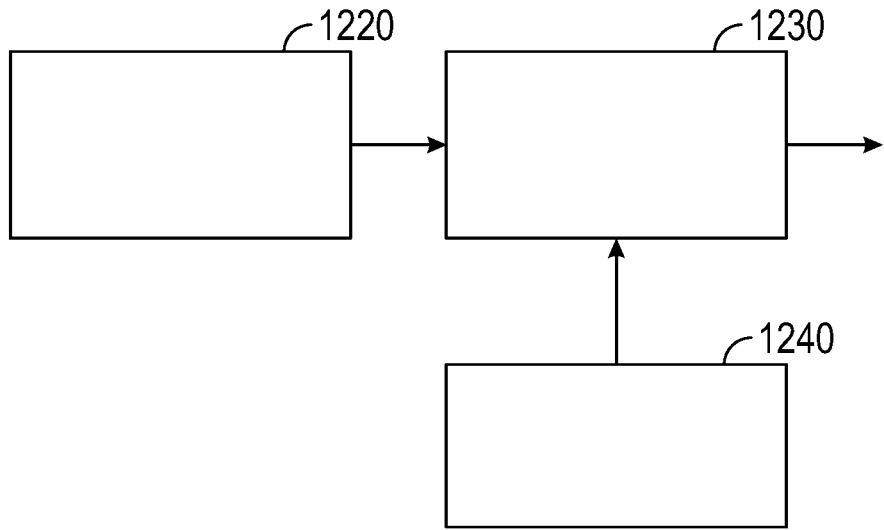

With a reference to FIGS. 12A, 12B, and 12C, FIGS. 12A, 12B and 12C illustrate diagrams of a radar raw track point associations from the radar module with target contour fusion of the multi-mode fusion module system. A top-down processing is performed by the radar sensor module for the sensed data from the track association with the target contour fusion mapping. In FIG. 12A for each radar point 1200 $m_k$, the minimum distance perpendicular distance $D(m_k)$ 1210 to centroids of each LIDAR based contour is commutated and this is denoted as $D(m_k)$ 1210, if $D(m_k)<T$ the $m_k$ a resulting commutation is assigned to the LIDAR based contour within a minimum distance. If not assigned, $m_k$ is treated as a candidate for update to the fusion data tracking. In FIG. 12B a LIDAR based contour is generated surrounding the remote vehicle in relation to the host vehicle were again $m_k$, the minimum distance perpendicular distance $D(m_k)$ 1210 to centroids of each LIDAR based contour. In FIG. 12C radar point data is received 1220 and a processing of the radar points and fusion data association is performed 1230 with received top-down fusion track information 1240. This resulting processing enables generation of enhanced radar raw measurement information to calibrate as an example the LIDAR module threshold adjustments.

Figure 13:
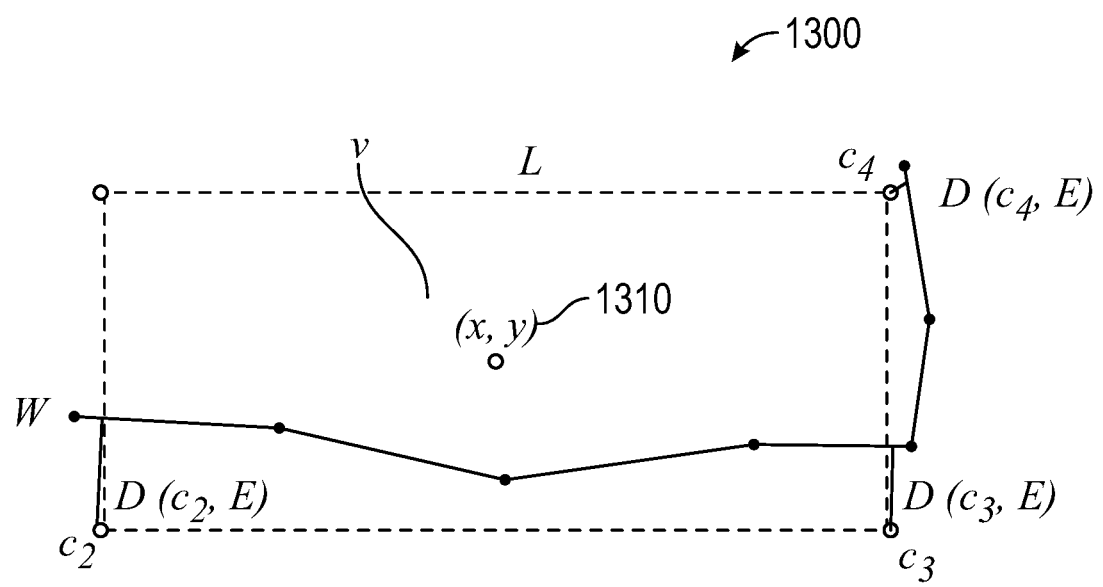
FIG. 13 is a functional block diagram illustrating a graphic view of vision track associations of the track level sensor module of the multi-mode module system according to an exemplary embodiment.

With a reference to FIG. 13, FIG. 13 illustrates a graphic view of vision track associations of the track level of the vision sensor module of the multi-mode fusion module system. A top down processing of the vision target of interest 1300 denoted as a vision target V is shown in FIG. 13 is performed. The vision target V illustrated vertical and longitudinal displacements are algorithmically calculation. The vision target V is given the following attributes: x for longitudinal displacement, y for lateral displacement, vx and vy, W for width, and L for length. For each object of interest 1300 V, initially the four corners are commutated, the four corners are $c_i$, i=1, . . . 4, which are commutated as follows: x−W/2, y−L/2, x−W/2, y+L/2, x+W/2, y−L/2, and x+W/2, y+L/2. A distance is commutated from the object of interest 1300 V to each contour E, which may be defined as the shortest distance from each of the four corners to the contour. The distance is commutated as follows:

$$d(v,E)=\min_i\{d(c_i,E)\}$$

where $d(c_i,E)$ is the shortest Euclidean distance from the point $c_i$ to the line segments in E. Then an augmentation of the distance metric between the vision target a velocity and fusion target velocity is calculated as follows:

$$d(V,E)=\alpha\min_i\{d(c_i,E)\}+\beta\|v_F-v_V\|,$$

where α and β are weighted factors, $v_F$ and $v_V$ are fusion and vision velocities.

After which, the vision target V is assigned to the contour with the shortest distance d(V, E) if the shortest distance is less than a pre-defined threshold.

While at least one exemplary aspect has been presented in the foregoing detailed description of the disclosure, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing an exemplary aspect of the disclosure. It being understood that various changes may be made in the function and arrangement of elements described in an exemplary aspect without departing from the scope of the disclosure as set forth in the appended claims.

What is claimed is:

1. A hybrid multi-mode fusion apparatus implemented to fuse multiple different formats of data sensed from a set of heterogeneous sensors to generate cue information for each sensor for sensing data of driving surroundings, the hybrid multi-mode fusion apparatus comprising:

a sensor level processor associated with a particular heterogeneous sensor to generate a first level of data based on sensory level data of a target of interest in the driving surroundings by sensory level processing of sensory data;

a feature level processor to generate a second level of data of one or more feature representations in the driving surroundings based in part on the first level of data wherein the feature representations are created using algorithmic solutions from a pixel level processing of feature data;

an object level processor to generate a third level of data of object representations in the driving surroundings wherein the object representations are detected by the set of heterogeneous sensors and by a multi-mode fusion module wherein the object representations comprise physical estimations of physical objects using algorithmic solutions from an object level processing of object data;

the multi-mode fusion module to operate in a first mode to receive fused data of multiple different formats sensed from the set of heterogeneous sensors and to operate in a second mode to send the fused data to each of the heterogeneous sensors, the multi-mode fusion module performing the steps of:

in the first mode, in a bottom up process flow, sending an output of sensory data comprising sensor level data detected by at least one heterogeneous sensor of the set of heterogeneous sensors wherein the set of heterogeneous sensors at least comprises: a vision sensor to detect at least binary data of color pixels, a radar sensor to detect at least range data, and a LIDAR sensor to detect point cloud data of the driving surroundings, the output of the sensory data from the set of heterogeneous sensors is sent to an association and alignment correction module that utilizes parametric association and data alignment correction solutions to aggregate and combine a set of the first, second and third level data determined to relate to the target of interest in order to make a set of alignment corrections by a tracking of the target of interest, and to apply a set of corrections for vision misalignment by aligning one or more of the vision sensors based on frame coordinates and angle estimations of a heading of the tracked target of interest and by removing mismatched angle data which fails to correlate with one or more angle estimations generated by the data alignment correction solutions;

in the second mode, in a top-down process flow, sending fused data of cueing information to one or more heterogeneous sensors comprising data about a fusion target, a contour position, and a velocity derived from the cueing information via a feedback path from the multi-mode fusion module to each of the heterogeneous sensors wherein a sensor module associated with each heterogeneous sensor utilizes an algorithmic solution to generate calibration information to perform a bias correction of each heterogeneous sensor in a real-time operation; and a fusion track data file used to store prior fused data to enable the multi-mode fusion module to send cueing information based upon the stored prior fused data to each heterogeneous sensor.

2. The multi-mode fusion apparatus of claim 1, wherein the vision misalignment is corrected based on prior angle information resulting in incremental changes to an alignment of the vision sensor.

3. The multi-mode fusion apparatus of claim 2, wherein the cueing information is based on the prior stored fused data comprising historical angle data.

4. The multi-mode fusion apparatus of claim 3, wherein the cueing information is processed by a sensor module to adjust one or more filtering schemes and threshold levels of each sensor, to estimate sensor alignment, and to measure a bias of each sensor.

5. The multi-mode fusion apparatus of claim 4, the multi-mode fusion module, further comprising: a LIDAR processing module receiving the point cloud data supplied by the LIDAR sensor to determine the target of interest wherein the point cloud data is processed in two stages comprising a first estimation stage to correct LIDAR alignment and bias, and a second threshold stage to make threshold estimations to remove ground points from a set of points of the point cloud data.

6. The multi-mode fusion apparatus of claim 5, further comprising: a multi-level fusion module, wherein the multi-level fusion module comprises a single event scheme for fusing sensor data from the vision sensor, LIDAR sensor, and radar sensor wherein the sensor data is processed from each sensor independently and in a distributed manner that is timed to operate in sync for sensor data not actually received in sync.

7. The multi-mode fusion apparatus of claim 6, the single event scheme further comprising: at an initial cycle $t_0$, a timing map based on a common time stamp is generated for an arrival time of each packet of sensor data from each sensor as a result of enabling sensor data arriving in a single cycle.

8. The multi-mode fusion apparatus of claim 7, further comprising: the multi-mode fusion module compensating for deviations in data arrival times by using algorithmic solutions to predict prediction delta corrections $\Delta_{[1 \ldots 4]}$ in data arrival times of the sensor data from each of the sensors by calculating at the start of a cycle t to a subsequent t+1 cycle, a prediction delta correction $\Delta$ for each subsequent sensor data arrival time.

9. The multi-mode fusion apparatus of claim 1, wherein the multi-mode fusion module is configured to reduce delays in a processing cycle by using predictive data of delays of arrival of sensor data wherein the prediction delta corrections $\Delta_{[1 \ldots 4]}$ are propagated throughout an entire cycle offsetting the prior arrival time prediction for each sensor data arrival time.

10. A hybrid multi-mode fusion method for fusing multiple different formats of data sensed from a set of heterogeneous sensors for generating cue information for each sensor when sensing data of driving surroundings, comprising:

generating, by a sensor level processor associated with a particular heterogeneous sensor, a first level of data based on sensory level data of a target of interest in the driving surroundings by sensory level processing of sensory data;

generating, by a feature level processor, a second level of data of one or more feature representations in the driving surroundings based in part on the first level of data wherein the feature representations are created using algorithmic solutions from a pixel level processing of feature data;

generating, by an object level processor, a third level of data of object representations in the driving surroundings wherein the object representations are detected by the set of heterogeneous sensors and by a multi-mode fusion module wherein the object representations comprise physical estimations of physical objects using algorithmic solutions from an object level processing of object data, operating the multi-mode fusion module in a bottom-up mode to fuse data of multiple different formats sensed from the set of heterogeneous sensors;

operating the multi-mode fusion module in a top-down mode to distribute fused data to the set of heterogeneous sensors, the multi-mode fusion module further performing the steps of:

in the first mode, in a bottom up process flow, sending an output of sensory data comprising sensor level data detected by at least one heterogeneous sensor of the set of heterogeneous sensors wherein the set of heterogeneous sensors at least comprises: a vision sensor to detect at least binary data of color pixels, a radar sensor to detect at least range data, and a LIDAR sensor to detect point cloud data of the driving surroundings, the output of the sensory data from the set of heterogeneous sensors is sent to an association and alignment correction module that utilizes parametric association and data alignment correction solutions to aggregate and combine a set of the first, second and third level data determined to relate to the target of interest in order to make a set of alignment corrections by a tracking of the target of interest, and to apply a set of corrections for vision misalignment by aligning one or more of the vision sensors based on frame coordinates and angle estimations of a heading of the tracked target of interest and by removing mismatched angle data which fails to correlate with one or more angle estimations generated by the data alignment correction solutions;

in the second mode, in a top-down process flow, sending fused data of cueing information to one or more heterogeneous sensors comprising data about a fusion target, a contour position, and a velocity derived from the cueing information via a feedback path from the multi-mode fusion module to each of the heterogeneous sensors wherein a sensor module associated with each heterogeneous sensor utilizes an algorithmic solution to generate calibration information to perform a bias correction of each heterogeneous sensor in a real-time operation; and storing prior fused data received from the heterogeneous sensors to generate predictive data based upon stored prior fused data received to distribute by the multi-mode fusion module to the heterogeneous sensors for enhancing sensing accuracies.

11. The multi-mode fusion method of claim 10, further comprising:

correcting vision misalignment based on prior angle information resulting in incremental changes to an alignment of the vision sensor.

12. The multi-mode fusion method of claim 11, wherein the cueing information is based on the prior stored fused data comprising historical angle data.

13. The multi-mode fusion method of claim 12, further comprising: processing the cueing information by a sensor module to adjust one or more filtering schemes and threshold levels of each sensor, to estimate sensor alignment, and to measure a bias of each sensor.

14. The multi-mode fusion method of claim 13, the multi-mode fusion module further performing the step of: receiving, by a LIDAR processing module, the point cloud data supplied by the LIDAR sensor for determining the target of interest wherein the point cloud data is processed in two stages comprising a first estimation stage to correct LIDAR alignment and bias, and a second threshold stage to make threshold estimations to remove ground points from a set of points of the point cloud data.

15. The multi-mode fusion method of claim 14, further comprising: fusing, by a multi-level fusion module, in a single event scheme, sensor data from the vision sensor, LIDAR sensor, and radar sensor wherein the sensor data is processed from each sensor independently and in a distributed manner that is timed to operate in sync for sensor data not actually received in sync.

16. The multi-mode fusion method of claim 15, the multi-level fusion module further performing the step of: at an initial cycle $t_0$ $_{of}$ the single event scheme, generating a timing map based on a common time stamp for an arrival time of each packet of sensor data from each sensor as a result of enabling sensor data arriving in a single cycle.

17. The multi-mode fusion method of claim 10, the multi-mode fusion module further performing the step of: compensating for deviations in data arrival times by using algorithmic solutions for predicting prediction delta corrections $\Delta_{[1 \ldots 4]}$ in data arrival times of the sensor data from each of the sensors by calculating at the start of a cycle t to a subsequent t+1 cycle, a prediction delta correction $\Delta$ for each subsequent sensor data arrival time.

18. The multi-mode fusion method of claim 10, further comprising: reducing delays for each module cycle of the multi-mode fusion module by using predictive data to predict corrections in timing delays for prediction delta corrections $\Delta_{[1 \ldots 4]}$ of arrival of sensor data for each of the heterogeneous sensors during the multi-mode fusion module cycle wherein the prediction delta corrections $\Delta_{[1 \ldots 4]}$ are propagated throughout an entire cycle offsetting the prior arrival time prediction for each sensor data arrival time.

19. A hybrid multi-mode fusion system for fusing multiple different formats of data sensed from a set of heterogeneous sensors for generating cue information for each sensor when sensing data of driving surroundings, the hybrid multi-mode fusion system comprising:
at least one module for multi-mode data fusion; and
at least one computer-readable storage device comprising instructions that when executed cause performance of a method of fusing data by the multi-mode data fusion module for sensor data received from a set of heterogeneous sensors, the method comprising:

operating, in a first mode, the multi-mode fusion module configured to receive the data of multiple different formats sensed from the heterogeneous sensors;
operating, in a second mode, the multi-mode fusion module configured to send fused data to each of the heterogeneous sensors;
fusing, by the multi-mode fusion module as instructed, the received data of multiple different formats of each of the heterogeneous sensors and sending the fused data to each of the heterogeneous sensors, the multi-mode fusion module further performing the steps of:
in the first mode, in a bottom up process flow, sending an output of sensory data comprising sensor level data detected by at least one heterogeneous sensor of the set of heterogeneous sensors wherein the set of heterogeneous sensors at least comprises: a vision sensor to detect at least binary data of color pixels, a radar sensor to detect at least range data, and a LIDAR sensor to detect point cloud data of the driving surroundings, the output of the sensory data from the set of heterogeneous sensors is sent to an association and alignment correction module that utilizes parametric association and data alignment correction solutions to aggregate and combine a set of the first, second and third level data determined to relate to a target of interest in order make a set of alignment corrections by a tracking of the target of interest, and to apply a set of corrections for vision misalignment by aligning one or more of the vision sensors based on frame coordinates and angle estimations of a heading of the tracked target of interest and by removing mismatched angle data which fails to correlate with one or more angle estimations generated by the data alignment correction solutions;
in the second mode, in a top-down process flow, sending fused data of cueing information to one or more heterogeneous sensors comprising data about a fusion target, a contour position, and a velocity derived from the cueing information via a feedback path from the multi-mode fusion module to each of the heterogeneous sensors wherein a sensor module associated with each heterogeneous sensor utilizes an algorithmic solution to generate calibration information to perform a bias correction of each heterogeneous sensor in a real-time operation; and
storing, in a track data file coupled to the multi-mode fusion module, prior fused data fused from the heterogeneous sensors to generate predictive data based upon stored prior fused data to send to the heterogeneous sensors.

20. The hybrid multi-mode fusion system of claim 19 wherein the cueing information is processed by a sensor module to adjust one or more filtering schemes and threshold levels of each sensors, to estimate sensor alignment, and to measure a bias of each sensor.

* * * * *